Jan. 7, 1958 E. A. BERG 2,819,140

TELEPHONE CABINET

Filed Oct. 21, 1955

INVENTOR.

Edwin A. Berg

BY

McMorrow, Berman + Davidson

Attorneys.

United States Patent Office 2,819,140

Patented Jan. 7, 1958

2,819,140

TELEPHONE CABINET

Edwin Andrew Berg, Shreveport, La.

Application October 21, 1955, Serial No. 542,034

1 Claim. (Cl. 312—242)

This invention relates to telephone cabinets, and more particularly has reference to a cabinet of the type adapted to be mounted in a wall, the cabinet in one form being so designed as to permit access to the telephone from the room at either side of the wall, and the cabinet in another form being recessed in the wall and providing access to the telephone from one side only of the wall.

Particularly in the first instance illustrated above, a telephone cabinet is enabled to discharge substantially more useful purposes than merely supporting a telephone adjacent a wall surface. In accordance with the invention, the partitioned cabinet designed to provide access to the telephone from rooms at either side of the wall will permit one to have ready access to the telephone from one room, when the telephone is in the next room, without the necessity of going from the first to the second room for the purpose of answering the telephone or making a call.

A further object of importance is to so design the telephone cabinet as, when one desires to use the telephone in one room, to permit the person to have full privacy, by reason of the adaptability of the device to completely partition the part of the cabinet opening upon one room from the other part of the cabinet, opening upon an adjacent room.

Another object of importance is to provide a telephone cabinet as described which will be particularly designed, by reason of its being constructed of preassembled components, to be installed with marked facility, and with the expenditure of a minimum loss of time.

Another object is to provide a telephone cabinet as described wherein the cabinet will be attractive, simply but strongly constructed, can be readily adapted for mounting in conventional room partitions or walls of different thicknesses, and can be mounted in a room wall at any of various desired locations, and at any selected elevation.

Other objects will appear from the following description, the claim appended thereto, and from the annexed drawings, in which like reference characters designate like parts throughout the several views, in which:

Figures 1, 2, 3, 4, 5:
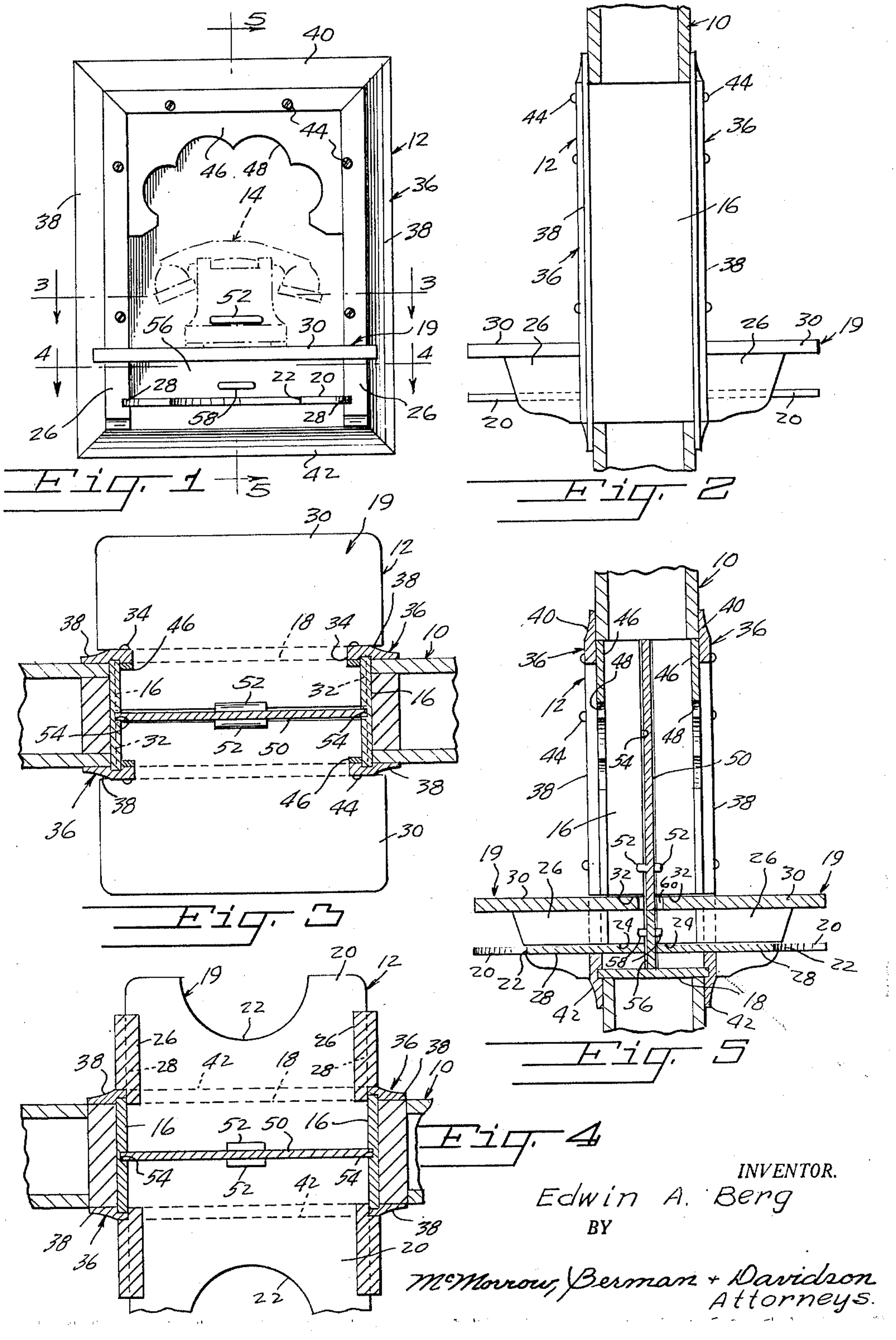
Figure 1 is a front elevational view of a telephone cabinet formed according to the present invention.
Figure 2 is a side elevational view.
Figure 3 is a horizontal section on line 3—3 of Figure 1.
Figure 4 is a horizontal section on line 4—4 of Figure 1.
Figure 5 is a vertical section on line 5—5 of Figure 1.

The reference numeral 10 generally designates a conventional room wall, while the reference numeral 12 designates the telephone cabinet constituting the present invention, shown in supporting relation to a conventional telephone generally designated at 14.

The telephone cabinet includes a U-shaped frame including vertically extending side frame members 16, and a horizontally disposed bottom frame member 18 fixedly secured at its opposite ends to the side frame members 16. The members 16, 18, are of a width corresponding to the overall thickness of the wall 10, as shown to particular advantage in Figure 5, and it will be understood that depending on the thickness of the particular wall in which the device is to be mounted, the width of the side and bottom frame members will be selected correspondingly. In other words, since room wall thicknesses are generally of three main sizes, the device when manufactured would be made in corresponding widths, so as to be used in a room wall having a thickness corresponding to the width of one of the sizes of the device.

The frame composed of side frame members 16 and the bottom frame member 18 constitutes one main component of the device, and connected to the frame and extending laterally, outwardly therefrom in opposite directions are shelf assemblies generally designated at 19. The shelf assemblies 19 each includes a pair of oppositely, outwardly extending book support shelves 20, 20 (Figure 5) disposed in a common horizontal plane and having deeply cut, semicircular recesses 22 formed in their outer edges, medially between the opposite side edges thereof, to provide hand-receiving recesses, so that one may readily grasp and pull outwardly a telephone book, not shown, supported upon either of the shelves 20.

The shelves 20 are slidably mounted in horizontally extending, transverse grooves 24 facing inwardly of the frame, and formed in the lower end portions of the respective side frame members 16.

Further, in alignment with the grooves 24 are horizontally extending, inwardly facing grooves 28, formed in the inner surfaces of brackets 26 projecting laterally, outwardly from the frame into the rooms separated by the wall 10.

Upper telephone support shelves 30 are disposed in a common horizontal plane paralleling the plane of the lower shelves 20, and are secured to the horizontal top edges of the brackets 26.

The inner side edge portions of the upper shelves 30 are engaged slidably in grooves 32 horizontally extending transversely of the lower portions of the side frame members 16.

The portions of the shelves 30 that are engaged in the grooves 32 are recessed slightly, and communicating with the recesses are inwardly cut recesses 34 (Figure 3), receiving the sides of rectangular facings generally designated at 36.

The facings 36 are in the form of rectangular moldings or frames, and include side facing strips 38 vertically disposed, and connected by miter joints to horizontally extending top and bottom facing strips 40, 42, respectively. The facings can be of any desired or ornamental cross section, those shown being illustrated merely by way of example, and being in no sense critical to successful operation of the invention.

Spaced uniform distances apart about the sides and top of the facings 36 are screws 44, extending inwardly through apertures of the facings, for connecting the facings to facing support plates 46 which, as shown in Figure 1, have upper portions exposed in the space circumscribed by the facings, said exposed portions of the plates 46 being ornamentally fashioned as for example by being provided with scalloped recesses 48. The plates 46 are fixedly secured to the respective side frame members 16.

The brackets 26 are fixedly secured to the lower portions of the side facing strips 38, while the book support shelves 20 are fixedly secured within the grooves 28 and the upper shelves 30 are similarly secured to the top surfaces of the brackets 26. As a result, each facing, together with the brackets 26, shelf 30, and shelf 20 connected fixedly thereto, is a single, preassembled facing assembly that is separably connected to the adjacent face of the frame by means of the screws 44.

Slidable in a vertical plane bisecting the frame medially between the opposite facings 36 thereof is a partition 50, having fixedly secured to the lower portion thereof handles 52 accessible from either room in which the device is mounted. The partition 50 slides in vertical grooves 54 formed in the respective side frame members 16, and extending fully to the top edges of said side frame members. The partition thus can be raised into the hollow space between the adjacent studs of the room wall, so that one desiring to have access to the telephone from one room, when the telephone is supported on the shelf 30 of the next room, need merely raise the partition. This saves the person the trouble of walking from one room to the other, and also permits the phone to be answered more quickly than is presently the case, in many instances.

Further, due to the arrangement illustrated, one desiring to use the telephone in either room has full privacy, since the partition is lowered in this event, so that the telephone can be used without the conversation being overhead in the next room.

In the aforementioned vertical plane, below the partition 50, there is mounted a lower partitioning member 56, slidably mounted in the lower portions of the grooves 54. The partition member 56 has handles 58 on opposite sides thereof, and the inner edges of the upper shelves 30 can be provided with recesses 60 clearing the handles 58, thus to permit the lower partition member 56 to be elevated for the purpose of permitting a telephone book to be obtained from one room, when it is supported in the adjacent room on the opposite side of the partition.

Of course, the particular construction details can be varied within the scope of the appended claim, and it is not considered that the construction is to be necessarily restricted to the particular arrangement illustrated and described herein.

In use of the device, and assuming that it is to be mounted in a room wall 10, a rectangular opening is cut in the room wall, after which the facing 36 is removed at one side of the device, by removing screws 44. The device can now be inserted into the wall opening, and when it is positioned fully through the wall opening, the facing 36 that was removed is reattached, so that when the device is completely installed, the facings engage against opposite surfaces of the wall 10, to hold the device in place therein. No other means of attaching the device to the wall is required, and it will be apparent that the construction is one that permits the installation of the device with particular ease and speed, and further, permits the installation to be made with little difficulty by the average householder, with the construction illustrated and described being one that will produce a workmanlike job when the device is fully mounted, even when the installation is performed by one having little previous skill.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A wall cabinet for providing access to a telephone from each of different rooms separated by a wall, comprising a rectangular frame adapted for mounting in an opening of said wall and proportioned to open upon both of said rooms; a pair of upper shelves in a common horizontal plane spaced closely apart at opposite sides of a vertical plane bisecting said frame for support of a telephone instrument upon a selected one of said upper shelves; a pair of lower shelves spaced vertically from the upper shelves and disposed in a common horizontal plane at opposite sides of said vertical plane; an upper partition lying in said vertical plane and engaged at its opposite sides in the sides of the frame for vertical sliding movement, said partition including handles on its opposite faces and normally gravitating to a position in which its lower edge is disposed approximately in the first named horizontal plane; and a lower partition also lying in said vertical plane and slidably engaged in the sides of the frame, said lower partition including handles at its opposite sides, the lower partition extending in the space between the upper and lower shelves and normally supporting the upper partition in said position of the upper partition, said upper partition being vertically slidable in an upward direction from said position thereof independently of the lower partition.

References Cited in the file of this patent

UNITED STATES PATENTS

| | | |
|---|---|---|
| 1,694,556 | Neely | Dec. 11, 1928 |
| 1,697,685 | Grant | Jan. 1, 1929 |
| 2,460,464 | Lufkin | Feb. 1, 1940 |
| 2,558,536 | Bruder | June 26, 1951 |